(12) United States Patent
Godfrey et al.

(10) Patent No.: US 9,828,849 B2
(45) Date of Patent: Nov. 28, 2017

(54) FLOW MONITORING USING FIBRE OPTIC DISTRIBUTED ACOUSTIC SENSORS

(71) Applicant: OPTASENSE HOLDINGS LIMITED, Farnborough, Hampshire (GB)

(72) Inventors: Alastair Godfrey, Farnborough (GB); Roger Ian Crickmore, Farnborough (GB)

(73) Assignee: Optasense Holdings Limited (GB)

( * ) Notice: Subject to any disclaimer, the term of this patent is extended or adjusted under 35 U.S.C. 154(b) by 595 days.

(21) Appl. No.: 14/346,437

(22) PCT Filed: Sep. 28, 2012

(86) PCT No.: PCT/GB2012/052408
§ 371 (c)(1),
(2) Date: Mar. 21, 2014

(87) PCT Pub. No.: WO2013/045941
PCT Pub. Date: Apr. 4, 2013

(65) Prior Publication Data
US 2014/0216151 A1 Aug. 7, 2014

(30) Foreign Application Priority Data
Sep. 29, 2011 (GB) .................................. 1116816.8

(51) Int. Cl.
*E21B 47/10* (2012.01)
*G01F 1/66* (2006.01)
*G01F 1/704* (2006.01)

(52) U.S. Cl.
CPC ............ *E21B 47/101* (2013.01); *E21B 47/10* (2013.01); *G01F 1/663* (2013.01); *G01F 1/704* (2013.01)

(58) Field of Classification Search
CPC ........ E21B 47/10; E21B 47/101; G01F 1/704; G01F 1/7082; G01F 1/7086; G01P 5/241; G01P 5/242; G01P 5/244
See application file for complete search history.

(56) References Cited

U.S. PATENT DOCUMENTS 3,430,625 A * 3/1969 McLeod, Jr. ............ A61B 8/06
310/334
5,115,670 A * 5/1992 Shen ........................ G01F 1/66
73/61.41

(Continued)

FOREIGN PATENT DOCUMENTS

GB 2442745 4/2008
GB WO 2010136773 A2 * 12/2010 ........ E21B 43/11857

(Continued)

*Primary Examiner* — Peter Macchiarolo
*Assistant Examiner* — David L Singer
(74) *Attorney, Agent, or Firm* — McDonnell Boehnen Hulbert & Berghoff LLP (57) ABSTRACT

This application describes methods and apparatus for monitoring flow of fluids within conduits using fiber optic Distributed Acoustic Sensing (DAS). The method can determine flow rate and/or flow regime within a conduit such as within a production well or a pipeline. Embodiments involve introducing an acoustic stimulus (802) into the fluid within the conduit (801); interrogating an optical fiber (104) deployed along the path of the conduit to provide a DAS sensor; and analyzing the acoustic signals detected by a plurality of channels of the DAS sensor to determine at least one flow characteristic. Analyzing the acoustic signal comprises identifying reflections (804) of said acoustic stimulus caused by the fluid within the conduit and analyzing said reflections to determine any Doppler shift ($\Delta f$).

23 Claims, 4 Drawing Sheets

(56) References Cited

U.S. PATENT DOCUMENTS

| | | | |
|---|---|---|---|
| 6,067,861 A * | 5/2000 | Shekarriz | G01F 1/663 367/89 |
| 6,874,361 B1 | 4/2005 | Meltz et al. | |
| 2002/0063866 A1* | 5/2002 | Kersey | E21B 47/102 356/478 |
| 2005/0224229 A1 | 10/2005 | Blacklaw | |
| 2009/0114386 A1 | 5/2009 | Hartog et al. | |
| 2010/0107754 A1 | 5/2010 | Hartog et al. | |
| 2012/0013893 A1* | 1/2012 | Maida | E21B 47/16 356/73.1 |
| 2012/0152024 A1* | 6/2012 | Johansen | E21B 47/123 73/655 |

FOREIGN PATENT DOCUMENTS

| | | |
|---|---|---|
| WO | WO 98/34105 | 8/1998 |
| WO | WO 03/097997 | 11/2003 |
| WO | WO 2010/039950 | 4/2010 |

\* cited by examiner

FLOW MONITORING USING FIBRE OPTIC DISTRIBUTED ACOUSTIC SENSORS

FIELD OF THE INVENTION

This invention relates to flow monitoring in conduits and especially to monitoring of flow rate and/or flow regime using distributed acoustic sensing.

BACKGROUND OF THE INVENTION

In many situations there is a desire to monitor flow of fluid in conduits. For example in the oil and gas industry there is sometimes a desire to determine the flow rates of oil and gas through a production well at different parts of the well. The rate of flow of product at the top of the well can be relatively easily determined, for example by using a suitable flow meter. However the rate of flow at different depths into the well may be of interest. For example the rate of flow at different depths within the well may indicate the relative contribution to the total flow of the various different sections of the well which provide an inlet for the oil or gas. In addition the flow regime, for instance whether the flow is single phase or multi-phase or whether there is laminar flow or turbulent flow, may be of interest.

This may be useful for long term monitoring and/or to provide useful information for planning future wells. Also in some instances a well may be divided into a number of different production zones which are effectively owned or leased by different organisations. Thus there may be a need to determine the relative contribution to the total flow from each production zone.

The use of permanent flow meters at different depths within a well is not generally practical due to the difficulties in providing suitably rugged equipment that can survive the harsh conditions in a production well for long periods of time, and the difficulties in installing such equipment with a suitable power supply and means of relaying the flow information to the surface. Typically therefore flow readings are acquired periodically by inserting wire line tools having one or more flow meters into the well on a temporary basis and taking flow readings at different depths. However the use of wire line tools involves halting normal production and is a relatively expensive procedure.

It would therefore be desirable to be able to monitor production flow at different depths within a well in use without the need for inserting any special instruments into the flow. Similar consideration can apply in other fields of application, such as flow through sub-sea pipelines or pipelines in other locations without easy access.

SUMMARY OF THE INVENTION

The present invention therefore provides methods and apparatus for monitoring of fluid flow that mitigate at least some of the aforementioned disadvantages.

In general the present invention provides a method of monitoring flow along a conduit comprising: interrogating an optical fibre deployed along the path of the conduit to provide a distributed acoustic sensor having a plurality of sensing portions of fibre; and analysing the acoustic signals detected by said plurality of sensing portions of fibre to detect a signal indicative of a flow characteristic.

Embodiments of the present invention use a fibre optic distributed acoustic sensor to monitor acoustic signals from the fluid so as to detect a signal indicative of a flow characteristic. Fibre optic distributed acoustic sensing (DAS) is a known technique whereby a single length of optical fibre is optically interrogated, usually with one or more input pulses, to provide sensing of acoustic activity along its length. Optical pulses are launched into the fibre and the radiation backscattered from within the fibre is detected and analysed. By analysing the radiation backscattered from within the fibre, the fibre can effectively be divided into a plurality of discrete sensing portions which may be (but do not have to be) contiguous. Within each discrete sensing portion mechanical disturbances of the fibre, for instance, strains due to incident acoustic waves, cause a variation in the properties of the radiation which is backscattered from that portion. This variation can be detected and analysed and used to give a measure of the intensity of disturbance of the fibre at that sensing portion. As used in this specification the term "distributed acoustic sensing" will be taken to mean sensing by optically interrogating an optical fibre to provide a plurality of discrete acoustic sensing portions distributed longitudinally along the fibre and the term "distributed acoustic sensor" shall be interpreted accordingly. The term "acoustic" shall be taken to mean any type of mechanical vibration or pressure wave, including seismic waves.

DAS can be operated to provide many sensing channels over a long length of fibre, for example DAS can be applied on fibre lengths of up to 40 km or more with continuous sensing channels of the order of 10 m long. Thus a long length of conduit can be monitored. DAS has been proposed for use in monitoring pipelines, to detect third party interference. Also DAS has been proposed for use downwell. An optical fibre can be installed permanently in the well during fabrication and deployed to run the entire length of the well. The fibre can then be interrogated to provide a means of acoustic sensing within the well that requires no power in the well, and which can be operated during normal well production.

The ability to detect acoustic signals over a plurality of separate channels allows signals indicative of flow characteristics to be advantageously determined as will be described in detail below.

In a first aspect of the present invention there is provided a method of monitoring fluid flow along a conduit comprising: introducing an acoustic stimulus into the fluid within the conduit; interrogating an optical fibre deployed along the path of the conduit to provide a distributed acoustic sensor having a plurality of sensing portions of fibre; and analysing the acoustic signals detected by said plurality of sensing portions of fibre in response to said acoustic stimulus to determine at least one flow characteristic, wherein analysing the acoustic signal comprises identifying reflections of said acoustic stimulus caused by the fluid within the conduit and analysing said reflections to determine any Doppler shift.

The flow characteristic may comprise the flow regime, i.e. whether the flow is single or multiphase, laminar or continuous or turbulent flow. The skilled person will appreciate that flow can be characterised in various ways depending on the phases of the flow and how they are arranged and how smooth or otherwise the flow is. The flow characteristic may also be a flow rate.

From the Doppler shift the speed of flow of fluid may be determined and/or any variation in the speed of flow of the fluid. The acoustic stimulus may comprise at least one acoustic pulse of a defined acoustic frequency to allow detection of a Doppler shift. To improve detection of the reflected signals the method may comprise transmitting at least one additional acoustic stimulus into the fluid in the conduit to mix with the reflected signal to improve signal to noise ratio.

The method may also comprise determining the rate of propagation of the acoustic stimulus along the conduit. The rate of propagation in effect indicates the speed of sound within the fluid in the conduit. The speed of sound may depend on the flow regime within the conduit and hence detecting a change in the speed of sound may indicate a change in flow regime, for instance a change in phase. The method may therefore comprise analysing the detected acoustic signals to detect any change in propagation speed along the conduit. The propagation rate and Doppler shift may be correlated/compared along the conduit. The flow rate determined from the Doppler shift can be taken into account to determine any change in propagation rate which is not simply due to a change in flow speed of the fluid.

The method may also comprise determining the attenuation of the acoustic stimulus as it travels along the conduit. The attenuation of the stimulus may also depend on the flow regime of the fluid in the conduit and thus detecting a change in the rate of attenuation may indicate a change in flow regime. Any change in attenuation rate may be correlated/compared with any change in Doppler shift along the conduit The acoustic stimulus may comprise at least one acoustic pulse having a time varying frequency and/or a pulse that has a significant spectral bandwidth. Analysing the detected acoustic signals may comprise applying spectral analysis. The attenuation of signals in the conduit depends on the size of any discontinuities within the conduit, e.g. gas pockets etc., and the wavelength of the acoustic stimulus. By varying the frequency and hence wavelength of the acoustic stimulus and looking for those frequencies which are strongly attenuated the size and locations of discontinuities within the fluid flow may be determined.

The method may comprise analysing the frequency spread of the detected signal to determine a flow regime.

The method may comprise inducing the acoustic stimulus using an acoustic transducer. The transducer may be hydraulically actuated. The method may also comprise using a separate flow conduit running along the same path as the main conduit to introduce the acoustic stimulus into the conduit.

The conduit may be a flow pipe within a wellbore. The method may therefore comprise a method of monitoring fluid flow within a well.

The method also applies to a method of processing data from a fibre optic distributed acoustic sensor having an optical fibre deployed along the path of a conduit so as to determine at least one flow characteristic of fluid flow in the conduit, the method comprising taking the detected acoustic signals from a plurality of sensing portions of the optical fibre and analysing the detected acoustic signals detected by said plurality of sensing portions of fibre in response to said acoustic stimulus propagating along the conduit to determine at least one flow characteristic, wherein analysing the acoustic signal comprises identifying reflections of said acoustic stimulus caused by the fluid within the conduit and analysing said reflections to determine any Doppler shift.

The method of processing may involve any or all of the steps described above.

In general the present invention relates to a method of monitoring fluid flow along a conduit comprising: introducing an acoustic stimulus into the fluid within the conduit; interrogating an optical fibre deployed along the path of the conduit to provide a distributed acoustic sensor having a plurality of sensing portions of fibre; and analysing the acoustic signals detected by said plurality of sensing portions of fibre in response to said acoustic stimulus to determine at least one flow characteristic.

In another aspect of the present invention there is provided a method of monitoring flow along a conduit comprising: interrogating an optical fiber deployed along the path of the conduit to provide a distributed acoustic sensor having a plurality of sensing portions of fiber; and analyzing the acoustic signals detected by said plurality of sensing portions of fiber so as to detect a detect a distinctive acoustic signal moving within the conduit.

The method may comprise correlating the signals from a plurality of sensing portions of fiber so as to detect movement of a distinctive acoustic signal. The method may comprise determining flow rate of the fluid from the movement of the distinctive acoustic signal.

The method may comprise detecting distinctive acoustic signals of opportunity that naturally arise during operation of the conduit. Additionally or alternatively the method may comprise specifically generating distinctive acoustic signals. The distinctive acoustic signals may be generated by one or more structures located within the flow path of the conduit. The structures may be arranged to introduce discontinuities into the flow within the conduit. The method may comprise generating the distinctive acoustic signals to vary over time.

The method may comprise introducing an additional fluid into the conduit at a location to create a distinctive acoustic signal.

The invention also relates to a method of processing data from a fibre optic distributed acoustic sensor having an optical fibre deployed along the path of a conduit so as to determine at least one flow characteristic of fluid flow in the conduit, the method comprising taking the detected acoustic signals from a plurality of sensing portions of the optical fibre and analysing the acoustic signals detected by said plurality of sensing portions of fibre so as to detect a detect a distinctive acoustic signal moving within the conduit.

The method of processing may benefit from all the steps described above in relation to the method of monitoring a conduit.

The invention also relates to apparatus for monitoring a conduit suitable for performing any of the methods described above. Thus in another aspect there is provided an apparatus for monitoring fluid flow along a conduit comprising: an interrogator unit for interrogating an optical fibre deployed along the path of the conduit to provide a distributed acoustic sensor having a plurality of sensing portions of fibre; and a processor configured to analysing the acoustic signals detected by said plurality of sensing portions of fibre with an acoustic stimulus propagating in the fluid within the conduit to determine at least one flow characteristic, wherein said processor is configured to analyse the acoustic signal to identify reflections of said acoustic stimulus caused by the fluid within the conduit and analyse said reflections to determine any Doppler shift.

DESCRIPTION OF THE DRAWINGS

The invention will now be described by way of example only with reference to the following drawings, of which.

DESCRIPTION OF THE INVENTION

Figure 1:
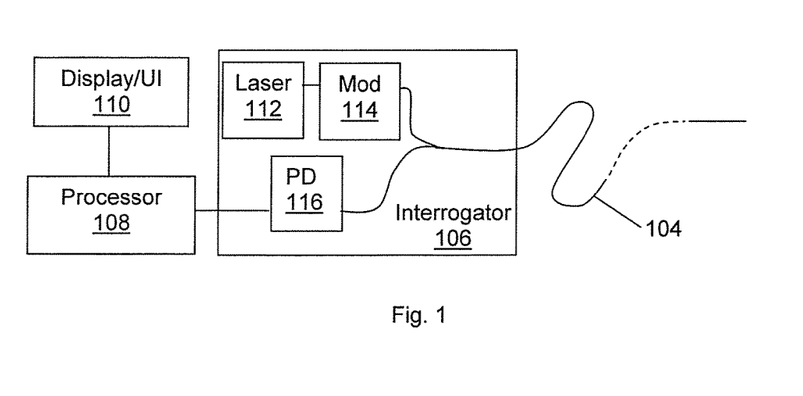
FIG. 1 illustrates the basic components of a fibre optic distributed acoustic sensor.

FIG. 1 shows a schematic of a distributed fibre optic sensing arrangement. A length of sensing fibre 104 is removably connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometers in length and can be at least as long as the depth of a wellbore which may be at least 1.5 km long. The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the fibre may comprise a fibre which has been fabricated to be especially sensitive to incident vibrations. The fibre will be protected by containing it with a cable structure. Although standard cables designed for downwell operation could be used some designs prevent much of the acoustic signal that is incident on the outside of the cable from reaching the inner fibre. Therefore in some embodiments special cables could be used which transmit a greater proportion of acoustic signal to the fibre itself. In use the fibre 104 is deployed in an area of interest to be monitored which, in the present invention may be along the path of a conduit, such as the length of a wellbore in a production or injection well as will be described.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto, although DAS sensors relying on a single interrogating pulse are also known and may be used. Note that as used herein the term "optical" is not restricted to the visible spectrum and optical radiation includes infrared radiation and ultraviolet radiation. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulses separated by a known optical frequency difference. The interrogator also comprises at least one photodetector 116 arranged to detect radiation which is Rayleigh backscattered from the intrinsic scattering sites within the fibre 104. A Rayleigh backscatter DAS sensor is very useful in embodiments of the present invention but systems based on Brillouin or Raman scattering are also known and could be used in embodiments of the invention.

The signal from the photodetector is processed by signal processor 108. The signal processor conveniently demodulates the returned signal based on the frequency difference between the optical pulses, for example as described in GB2,442,745. The signal processor may also apply a phase unwrap algorithm as described in GB2,442,745. The phase of the backscattered light from various sections of the optical fibre can therefore be monitored. Any changes in the effective optical path length within a given section of fibre, such as would be due to incident pressure waves causing strain on the fibre, can therefore be detected.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m, which for a continuous length of fibre deployed down the entire length of a 4 km production well say provides 400 or so independent acoustic channels deployed along the entire length of the well which can provide effectively simultaneous monitoring of the entire length of the wellbore. In an application to downwell monitoring the individual sensing portions may each be of the order of 10 m in length or less, say 5 m in length. In some applications the individual sensing portions may be of the order of 1 m in length.

Figure 2:
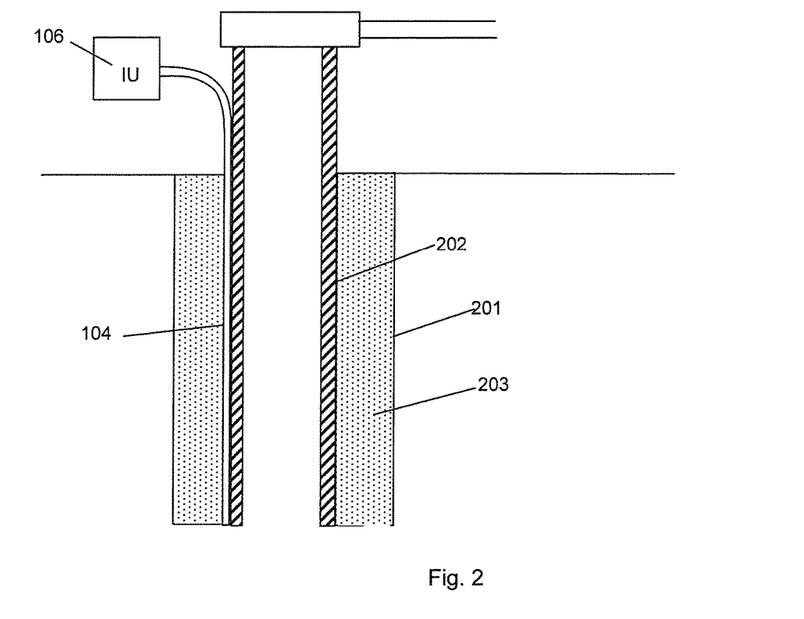
FIG. 2 illustrates deployment of a fibre optic distributed acoustic sensor in a wellbore.

As the sensing optical fibre is relatively inexpensive the sensing fibre may be deployed in a location in a permanent fashion as the costs of leaving the fibre in situ are not significant. In use in a wellbore the fibre is therefore conveniently deployed in a manner which does not interfere with the normal operation of the well. FIG. 2 illustrates a DAS sensor deployed in a wellbore setting.

Typically production or injection wells are formed by drilling a bore hole 201 and then forcing sections of metallic casing 202 down the bore hole. The various sections of the casing are joined together as they are inserted to provide a continuous outer casing. After the production casing has been inserted to the depth required the void between the borehole and the casing is backfilled with cement 203, at least to a certain depth, to prevent any flow other than through the well itself. As shown in FIG. 2 the optical fibre to be used as the sensing fibre 104 may be clamped to the exterior of the outer casing 202 as it is being inserted into the borehole. In this way the fibre 104 may be deployed in a linear path along the entire length of the wellbore and subsequently cemented in place for at least part of the wellbore. It has been found that an optical fibre which is constrained, for instance in this instance by passing through the cement back fill, exhibits a different acoustic response to certain events to a fibre which is unconstrained. An optical fibre which is constrained may give a better response than one which is unconstrained and thus it may be beneficial to ensure that the fibre in constrained by the cement. Other deployments of optical fibre may be possible however, for instance the optical fibre could be deployed within the outer casing but on the exterior of some inner casing or tubing.

Fibre optic cable is relatively robust and once secured in place can survive for many years in the downwell environment.

The fibre protrudes from the well head and is connected to interrogator 106, which may operate as described above. Interrogator 106 may be permanently connected to the fibre 104 to provide continual acoustic/seismic monitoring and may monitor a range of well operations.

In embodiments of the present invention the DAS sensor is used to provide flow monitoring to determine the flow rate and/or flow regime of fluid within a conduit, i.e. oil or gas within a well during production.

In a simple arrangement the intensity of the acoustic signal at various channels could be analysed to determine an indication of the volume of flow, i.e. flow rate. In general the rate of flow correlates with the acoustic intensity detected. The signals from several sensing channels of the DAS sensor may be averaged to provide an overall indication of acoustic intensity for a given section of the conduit. For example if the acoustic sensing portions of the fibre are 10 m in length the returns from 10 adjacent sensing portions of fibre may be averaged to provide an overall indication of the intensity of the acoustic signal due to flow in a 100 m section of the well. In some instances the acoustic signals could be processed to remove signals due to non-flow sources of acoustic noise prior to being averaged. For instance if a pump in the well creates an acoustic signal at a known frequency the signals could be filtered to exclude such a frequency. Also if the acoustic energy arising due to the flow is concentrated in a particular frequency band the signal could be filtered, for example with a band pass filter, to isolate acoustic signals due to flow from other sources of acoustic noise. Thus an average signal of acoustic intensity which is due to flow may be determined.

Figure 3:
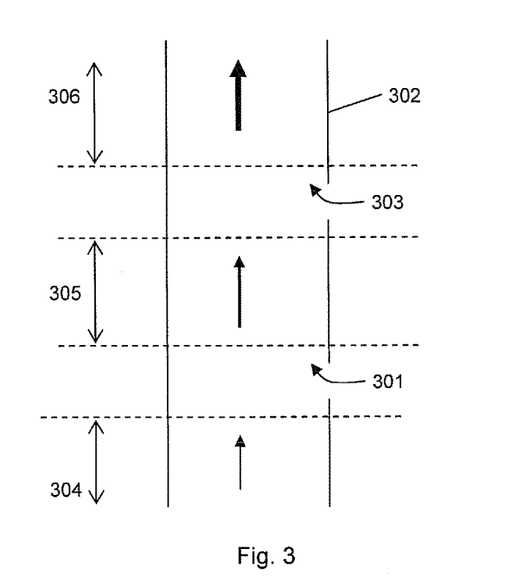
FIG. 3 illustrates in flow from different production zones within a well.

This can be useful to determine an indication of the proportion of flow from different production zones of the well. As mentioned above a well may be divided into several production zones, i.e. areas where inflow into the well occurs and in some arrangements the various production zones may be separated. For example FIG. 3 illustrates a first production zone 301 providing a flow path into a well 302 which is separated from a different production zone 303 which is at a different position (depth in this example in the well). It may be desired to determine the relative amount of flow due to production zone 301 as compared to production zone 303. The intensity of acoustic signals generated due to flow between the various flows may therefore be determined. Thus the average intensity in several channels of the DAS sensor deployed in section 304 of the well below production zone 301 may therefore be determined and compared to the average intensity in section 305 between production zones 301 and 302. Any flow from production zones lower than zone 301 will create a certain intensity in section 304. In section 305 the flow from production zone 301 will add to the overall flow in the well. By monitoring the average intensity in section 305 of the well an indication of the additional flow due to production zone 301 may be determined. Similarly the average intensity in section 306 above production zone 303 may be compared to the average intensity in section 305.

Measuring the change in intensity may not be able to determine absolute amount of flow, i.e. flow rate, at that part of the well, but comparing the intensity before and after the production zone may be used to indicate the relative strength of flow from that zone. Thus if there is no significant change in intensity between section 304 and 305 but a significant increase in intensity in section 306 this may be used to indicate that production zone 303 has a greater flow than production zone 301.

The acoustic signal from sensing channels (i.e. sensing portions of fibre) of the DAS sensor within the area of inflow of the production zones is therefore preferably also analysed to determine the relative flow rate. Again a more intense acoustic signal arising from the inflow region of one production zone as compared to another zone, e.g. inflow region 301 as compared to inflow region 303, may indicate a relatively greater inflow. However the acoustic intensity in the inflow regions may depend on characteristics of inflow other than just flow rate, e.g. amount of particulates being screened by sand filters etc. Thus by looking at the average intensity within the regions between inflow regions the differing effects of the inflow can be discounted.

It will be appreciated that the flow regime in a particular section of the conduit may well have an effect on the acoustic intensity arising through flow. Especially in oil and gas production wells the flow within the well may not simply be a continuous flow of a single homogenous fluid composition. In an oil well say there may be gases also released in production and which mix with the oil when flowing through the conduit. In some sections there may be single phase flow of the fluid but in other regions there may be multiphase flow—which could be laminar multiphase flow or turbulent flow. As the pressure varies along the flow path gases in the flow may form bubbles of varying sizes.

For example in wells where there is mixture of liquid and gas phases the flow may comprise, for example: bubble flow where the gas phase is dispersed as bubbles throughout the liquid phase; slug flow, where there is a generally continuous liquid phase but with large gas bubbles (often of varying sizes); a chaotic or transition flow regime without a continuous gas or liquid phase; and mist flow where there is a continuous gas phase with dispersed liquid droplets. In generally horizontal conduits such as pipelines one may experience, at relatively low flow rates, stratified flow, effectively a type of two phase flow, where the one type of fluid, e.g. the heavier fluid component, may flow on the bottom of the conduit and the lighter fluid component at the top. If the flow rates of the two fluid components are within a certain range of each other the flow may be smooth stratified flow. If the lighter fluid, e.g. the gas is flowing faster than the heavier fluid the flow may be wavy stratified flow. At high gas flow velocities the gas flow may move the centre of the conduit and flow within the liquid in annular dispersed flow. In some instances there may also be single phase flow.

Figure 4:
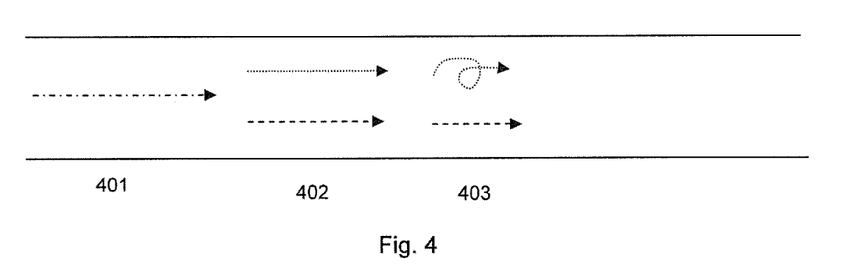
FIG. 4 illustrates different flow regimes within a conduit.

FIG. 4 illustrates different flow regimes along a conduit which may, for example be a section of well. Region 401 represents a first flow regime where the flow is single phase flow or a multiphase flow regime with the same flow velocity for each phase. There may be gas and oil mixed together, e.g. emulsified, and the composition flows as a continuous single velocity flow. Region 402 represents a flow regime where the gas and oil may have separated and may be flowing in a laminar or stratified manner, possibly at different speeds. Region 403 represents a third flow regime where one of the flows is turbulent.

Each of the different flow regimes may result in a different acoustic characteristic. For instance the acoustic intensity detected in a region of turbulent flow region may be generally greater than that for the other two illustrated regions. The turbulent region may also exhibit a greater variation in intensity than the regions corresponding to the other illustrated flow regimes. The spectral characteristics of the different regions may also be different.

One method may therefore comprise analysing the acoustic signals from a plurality of sensing channels of the DAS sensor to determine the flow regime of the fluid at the relevant section of conduit. It may be possible to determine the flow regime for a section of conduit by analysing the acoustic signal from the sensing portion of the DAS sensor adjacent the relevant section. However it will be appreciated that the flow will transition from one flow regime to another. Thus by looking at the acoustic signals detected by a plurality of sensing channels disposed along the length of the conduit any changes in the flow regime may be more readily detected.

Detecting a change in flow regime may be useful for several reasons. As mentioned above the overall acoustic intensity may be used to provide an indication of flow rate. However a region of turbulent flow may exhibit a higher acoustic intensity at a given flow rate than a region of single phase flow for example. Being able to determine the flow regime may allow compensation for any changes of flow regime. For instance if one section of conduit exhibits single phase type smooth flow and another section exhibits some single phase type smooth flow but also a region of turbulent flow the region of turbulent flow may be excluded in determining the average intensity, thus allowing comparison of the relative intensities of the single phase type regions only.

Knowing the flow regime may also, in some circumstances, be of use in well operation, for instance a pump operating in a region of turbulent flow may achieve a different efficiency to one operating in a region of single phase flow. Alternatively detecting a region of turbulent flow that begins at the same location as a well component, such as a pump, may be an indication that such component is not operating correctly.

In addition however some changes in flow regime may be expected as a result of changes in conditions within the well. For instance a change from single to multiphase flow, or a dispersed bubble flow to slug flow say, may occur at a certain known combination of temperature, pressure and flow conditions. By detecting the location within the well in which such a phase change occurs it will therefore be possible to determine some information about the well conditions at that point. Thus, for example, detecting a change in the phase of flow at a first location may allow one to determine some information about the well conditions at that location. The position of the phase change may also be combined with data from other sensors from that location, in particular data from a fibre optic distributed temperature sensor. A fibre optic distributed temperature sensing (DTS) sensor is a known type of sensor that uses backscatter from an optical fibre to determine temperature at a remote location. The DTS sensor which may implemented using the same optical fibre as the DAS sensor or using a different optical fibre (as the skilled person will appreciate typically a fibre optic cable may comprise a plurality of optical fibres within the cable). Knowing the temperature at the location of the phase change it may be possible to determine the pressure and/or flow rate at that location.

A method of flow monitoring may therefore comprise analysing the acoustic signals from a plurality of sensing portions of the optical fibre to detect acoustic characteristics associated with a change in flow regime. As noted above this may comprise detecting a change in at least one of average intensity, variation in intensity and spectral content of the detected acoustic signals.

The signals from a plurality of different sensing portions of the DAS sensor could additionally/alternatively be analysed so as to detect an acoustic feature moving in the conduit with the flow. Again, especially when considering flows in oil and gas wells, there may be discontinuities in the fluid which leads to distinctive acoustic features that travel within the fluid in the conduit. For example in an oil well there may be inflow of gas with the oil but the amount of gas may vary over time. Thus at one point in time the inflow may, for example, have a low proportion of gas and the flow may be mainly oil. At another point in time a relatively large amount of gas may enter into the flow and may, at some point in the flow to the surface, result in one or more large bubbles of gas within the oil. This flow may have a distinctive acoustic characteristic but the flow throughout the well to the surface may occur at the same general rate. By tracking the distinctive acoustic signal through the various sensing channels of the DAS sensor the flow rate of the fluid at different sections of the well may therefore be tracked.

One method may therefore comprise correlating the acoustic signals detected by sensing portions of the DAS sensor at different positions along the length of the conduit. The correlation may be a cross-correlation. By correlating the signals detected by the channels at different depths any characteristic acoustic feature that travels along the conduit for at least a part of the length of the conduit may be detected and by determining the speed with which the feature travels can be used to determine information about the flow rate.

The correlation may, of course, be constrained for a range of likely flow rates and various track-before-detect type algorithms may be applied.

Figure 5:
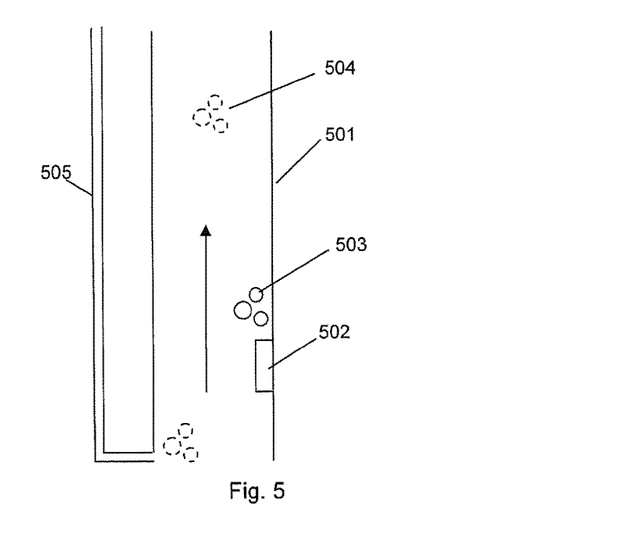
FIG. 5 illustrates introducing acoustic features into flow in a conduit.

In some instances one or more structures within the well may be arranged so as to deliberately introduce distinctive acoustic features into the flow. For example, a structure may be arranged within the flow path of the fluid so as to introduce acoustic features into the flow. For example, FIG. 5 illustrates how acoustic features could be created within the flow within a conduit 501. A structure 502 is located within the flow path within the conduit 501 and may for example be attached to an inner wall of the conduit. The structure is arranged so as to not interfere with normal operation of the conduit, e.g. the well, but is arranged to produce a feature 503 in the flow that has a characteristic acoustic signal that can be tracked. For example the structure 502 may be shaped so as to induce turbulent flow within otherwise steady flow. Vortex shedders and the like are well known which induce vortices in otherwise smooth flow. Additionally or alternatively the structure 502 may, for example, be arranged to provide a flow path that induces the formation of bubbles 503 in the flow. For example the structure 502 may provide a separate flow path with a change in diameter along its length to induce a flow rate/pressure change that induces the formation of bubbles.

In operation the flow of the fluid along the conduit and past the structure will result in disturbances 503 being induced in the flow. These disturbances will endure for at least a period of time in the flow and thus will travel in the conduit at the flow rate to a different position 504. By tracking the disturbances across a plurality of sensing portions of the distributed acoustic sensor the flow rate of fluid can be determined.

The structure may be arranged to continually create the disturbances, i.e. any flow inherently results in the disturbances 503 being produced. Whilst this will result in a constant stream of disturbances being generated the acoustic signals from the disturbances may vary over time allowing individual disturbances to be tracked as described above by cross correlating along the channels.

In some instances however the structure 502 may be arranged to produce time varying disturbances. In other words the disturbances produced inherently have a time variation that allows tracking. In one example the disturbances are created in a periodic manner such that there are gaps between disturbances introduced into the flow, the gaps being longer than the length of the sensing portions of the DAS sensor, such that individual disturbances can be readily tracked. The structure may therefore be operable so as to create a significant disturbance and also operable to create no significant disturbance and may be switched between the modes of operation. For instance a flow opening may be opened or closed as required.

The structure 502 may therefore have a power source or be powered from the surface and arranged to activate periodically. Supplying power in a well setting for longer term use is not trivial however. The structure may alternatively be hydraulically actuated from the surface and again activated periodically. In some arrangements however the structure may be self-contained and configured to use the flow of the fluid to drive periodic actuation or induce a time variation into the disturbances. The structure could have a power generating unit driven by the flow of the fluid or alternatively could use the flow to drive a moveable element to change the configuration of the structure 502 and hence vary the properties of the disturbances.

Another way of generating a disturbance within the flow with a characteristic acoustic signal could be to inject a fluid such as a gas or vapour into the flow at a certain point. In some conduits a separate flow conduit may exist or could be provided. Such a separate flow conduit may be used for transport of fluid in the opposite direction to the main flow. FIG. 5 illustrates a separate flow conduit 505 deployed alongside the main conduit 501 but in some embodiments the separate conduit could be deployed within the main conduit. The separate conduit may be in fluid communication with the main conduit through a non-return valve (not shown). Such a separate flow conduit could be used to inject a gas or vapour into the flow to create an acoustic disturbance that can be tracked along the conduit. When required gas such as compressed air or carbon dioxide for example could be pumped along the separate conduit 505 to introduce bubbles of gas that can be tracked.

Figure 6:
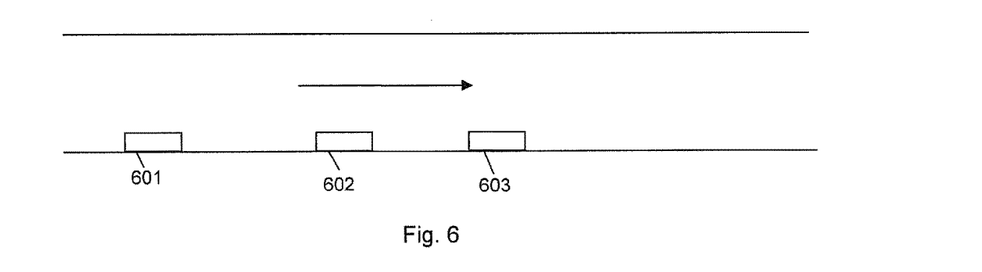
FIG. 6 illustrates multiple structures for generating characteristic acoustic signals in a conduit.

It will be noted that any disturbance in the flow may dissipate after a while. For example any bubbles may become so disperse within the flow as to be undetectable or turbulent flow may return to single phase type flow. However, as shown in FIG. 6, a series of disturbances inducing structures 601, 602, 603 could be arranged at different locations along a conduit.

Additionally or alternatively one or more structures could be provided in the flow path within the conduit that produce an acoustic signal in flow that depends upon the flow rate. For example one or more resonant structures could be arranged in the flow path that resonate a defined frequency at a certain flow rate. Referring again to FIG. 6 each of the structures 601, 602 and 603 could be a resonator arranged to resonate at a defined frequency at a given flow rate. If each resonator is arranged to resonator at a different frequency at a different flow rate then detection of a particular resonant frequency can be used as an indication of the relevant flow rate. For examples if resonator 601 resonates at frequency f1 at a flow rate R1, and resonators 602 and 603 resonate at different frequencies and at different flow rates then detecting a significant acoustic signal at frequency f1 can indicate that the flow rate is around R1. Alternatively one of the structures could have multiple resonances each of which are stimulated by different flow rates. In one embodiment a paddle wheel type arrangement could be arranged to be rotate at a rate proportional to the flow and which are arranged to generate an acoustic signal when rotating.

Vortex shedders can also be used to generate vortices and, in some arrangements, the frequency of the vortex, and also the acoustic signal generated by the vortex, depends upon the flow rate of the fluid. Thus by monitoring the frequency of the acoustic signals detected the flow rate of the fluid can be determined.

Introducing an acoustic stimulus into the fluid in the conduit, or in some circumstances the material of the conduit itself, can also be used to provide information about the flow regime and/or flow rate within the pipeline.

In one example an acoustic stimulus is introduced into the fluid in the conduit so as to travel along the conduit. The sensing channels of the DAS sensor are then analysed to determine the progress of the acoustic stimulus along the conduit. By analysing the propagation of the stimulus along the conduit information about the flow rate and flow regime within the conduit may be determined.

Figure 7:
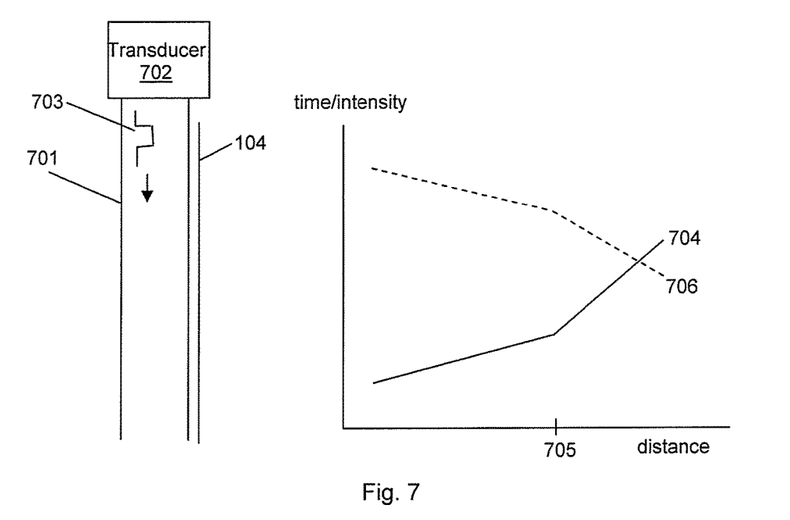
FIG. 7 illustrates introducing an acoustic stimulus into a conduit.

FIG. 7 illustrates a conduit 701, such as a conduit in a well, with an acoustic transducer 702 arranged to generate one of more acoustic pulses 703 to propagate along the conduit. The progress of the acoustic stimulus, i.e. pulse 703, is detected by the sensing portions of optical fibre 104.

In one method the speed at which the acoustic stimulus propagates along the conduit may be determined. In effect the speed of sound along the conduit is determined. The speed of sound within the fluid within the conduit may be affected by the flow regime within the conduit. Thus the speed of sound within single phase type flow of emulsified oil and gas may be significantly different to the speed of sound in a distinct two phase flow regime. In two phase flow such as stratified or laminar flow there may be a significant broadening in the duration of an acoustic pulse due different propagation speeds in the two distinct phases which does not occur in single phase type flow.

Thus one method may comprise introducing an acoustic stimulus, such as an acoustic pulse into the fluid in the conduit, determining the propagation of the stimulus along the conduit using the DAS sensor and identifying any areas of significant change in the speed of propagation. For example a step-change in the speed of propagation could indicate a phase change in the fluid flow. As mentioned above the knowledge of where phase changes occur is useful in its own right but also may be used to infer the properties of fluid flow at that point. Line 704 illustrates the principle of a plot of distance along the conduit against time. It can be seen that at location 705 a step change in the velocity of the stimulus along the conduit occurs.

In addition or alternatively the relative intensity of the stimulus as it propagates may be monitored. The amount of attenuation may depend on the flow regime. For example a flow regime with lot of gas bubbles may attenuate the stimulus more than a flow region with fewer gas bubbles. Thus step changes in the intensity of the signal detected by the DAS sensor as the stimulus progresses down the well may be used to determine locations of a change in flow regime. Line 706 illustrates an indicative simplified plot of general intensity against distance along the conduit (the skilled person will appreciate that in reality the relationship between attenuation and distance is not necessarily as simple as illustrated). It can be seen that the signal is attenuated as it travels along the conduit but a step change in the rate of attenuation occurs at location 705, again indicative of a phase change.

In some instances the acoustic stimulus may have a time varying frequency. For instance the stimulus may comprise a chirped acoustic pulse. Using a time varying acoustic stimulus can aid in identification of the signal in the sensing portions of the DAS sensor as the detected signals can be correlated with the frequency sweep of the stimulus. However the use of a range of acoustic frequencies in the stimulus also allows the propagation at different frequencies to be determined, which may be used to provide information about the flow regime. Alternatively the acoustic stimulus could be a wideband signal so that a range of frequencies are transmitted at the same time.

The amount of acoustic scattering of the stimulus as it propagates in the fluid will in part depend on the size and distribution of any discontinuities in the fluid, i.e. the size and distribution of gas bubbles etc., in relation to the acoustic wavelength. Thus by looking at whether a signal is strongly attenuated/reflected at a range of acoustic frequencies and hence wavelengths, then any features whose size is within the range of the acoustic wavelengths being used may be determined. Thus for instance any sizeable gas pockets within the fluid may be detected.

The acoustic signal may be introduced into the fluid by any suitable means. In oil and gas well implementations a hydraulically actuated transducer may be preferred. In such applications the stimulus may be introduced at the well surface with sufficient intensity to travel for a significant distance into the well.

In some instance however it may not possible to acoustically excite the whole of the well conduit from the surface. Also there can be advantages is determining how a stimulus travels in both directions within a well. In some instances it may therefore be desirable to introduce an acoustic stimulus into the well at a certain depth.

Acoustic transducers, for instance hydraulically actuated transducers, may therefore be arranged at various depths within the well. Additionally or alternatively, where a separate flow conduit exists (such as illustrated in FIG. 5) the flow conduit may be used to transmit acoustic signals to the well. By pressuring the separate flow conduit a resonance device or other transducer located along the path or at the end of the separate flow conduit may be used to produce an acoustic signal at a given depth in the well.

Additionally or alternatively an acoustic stimulus may also be induced in the material of the conduit itself. The acoustic stimulus induced in the material of conduit may couple to the fluid and hence promote an acoustic signal in the fluid. The amount of coupling may depend on the phase and/or speed of the fluid within the conduit. Thus detecting the amount of coupling may be a measure of the phase and/or speed of the fluid within the conduit. Inducing an acoustic stimulus into the material of the conduit and determining the flow characteristics of the fluid within the conduit from the coupling between the acoustic stimulus and the fluid is a novel aspect of the methods of flow monitoring of the present invention which may be used as a standalone method of flow monitoring. The amount of coupling may be determined, for instance, by the monitoring the rate of attenuation of the stimulus travelling in the conduit. This can be determined by looking at the intensity of the acoustic signals due to the stimulus propagating in the conduit. The acoustic stimulus travelling in the conduit will typically have a different rate of propagation, due to the different speed of sound in the material of the conduit, e.g. steel, than in the fluid, and/or may have distinct temporal and/or frequency characteristics. Likewise the coupling of the acoustic stimulus to the fluid may additionally or alternatively be determined by monitoring an increase in acoustic intensity in part of the conduit that correspond to the characteristics of the stimulus in the fluid, e.g. having a propagation rate and/or frequency characteristic corresponding to the propagation in the fluid.

It should be noted that whether the coupling of acoustic energy from the conduit to the fluid is detected as an increase or decrease in the intensity of the detected signal will depend on the arrangement of the fibre to the fluid and conduit. If the fibre is within the fluid (and relatively isolated from the conduit walls) then an increase in the detected intensity may be expected whereas if, as described above, the fibre is deployed outside of the conduit then a decrease in detected signal intensity may be detected.

In embodiments of the present invention the method may involve transmitting an acoustic stimulus into the fluid in the conduit, using the sensing portions of the DAS sensor to detect reflections of the acoustic stimulus and analysing the reflected signals to detect any Doppler shift in the reflected signals.

As an acoustic stimulus travels along the conduit some of the acoustic energy will be reflected by scattering sites in the flow, for example bubbles, particulates etc. These discontinuities in the flow will be moving at the flow rate and hence the reflection will be Doppler shifted. Thus the reflected signal will exhibit a frequency shift as compared to the original signal.

Figure 8:
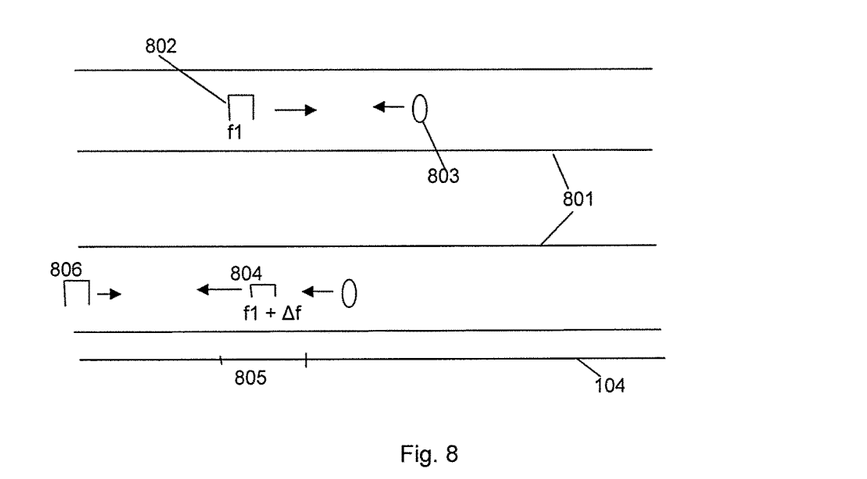
FIG. 8 illustrates detecting Doppler shift in reflected acoustic signals in a conduit.

FIG. 8 illustrates the principle and shows a conduit 801 at two different moments in time. In the first instance an acoustic stimulus, which is in the form of a pulse 802 is propagating in the conduit. In this example the pulse is propagating against the flow direction as would be expected in a downwell production well application where the pulse is introduced at the surface. However in other applications the acoustic stimulus may propagate in the same direction as the flow, for instance in an injection well application. In this example the pulse has a fairly narrowly defined frequency f1.

Within the flow is a discontinuity 803 which may be a gas bubble or the like. When the acoustic pulse 802 is incident on the discontinuity 803 a small portion of the acoustic energy may be reflected to form a reflected lower intensity pulse 804 travelling in the opposite direction to the original pulse, i.e. in this instance with the direction of flow. As the discontinuity is moving with the flow the reflected pulse experiences a Doppler shift and thus the reflected pulse has a frequency of f1+$\Delta$f.

The reflected pulse has a relatively low intensity and thus may be attenuated before reaching the end of the conduit. However the reflected signal can be detected by a sensing portion 805 of sensing fibre 104 in the vicinity of the reflection site. Thus the use of DAS, being deployed along the entire length of the fibre, allows such reflected signals to be detected.

As the frequency f1 the input pulse 802 is known the frequency of the reflected pulse can be determined and hence the amount of Doppler shift can be determined. Thus the speed of the discontinuity and hence the flow rate can be determined.

As mentioned the reflected signal may be weak but the detection can be improved by transmitting another pulse 806 into the conduit following the original pulse 802. This second pulse 806 can mix with the reflected signal and can improve the signal to noise ratio of the detected reflection signal.

The detected reflection signal may also provide information of the phase of flow. For single phase flow the whole fluid may be moving at generally the same speed. Thus the reflected signal may be expected to have a fairly well defined Doppler shift. Thus the frequency spectrum should show a fairly narrow frequency peak (assuming a narrow band input acoustic pulse 802) with a well defined Doppler shift. If two phase laminar flow is occurring there may be two relatively continuous flows which may have different speeds. This may lead to two reasonably defined frequency peaks in the spectrum with the relative Doppler shift for each peak giving the speed of the relevant flow. In turbulent flow however there may be a range of relative instantaneous velocities along the conduit. Thus the reflected signal may exhibit a range of Doppler shifts and hence the detected signal may have a broad range of frequencies, centred on the average flow speed.

Thus the frequency characteristics of the reflected signal may be analysed to determine not only the flow rate but the flow regime in the relevant location.

The Doppler method may be used with any or all of the other flow monitoring techniques described above. For example the flow rate profile determined from analysing the Doppler shift may be used together with an attenuation profile, for instance to identify any areas where the flow rate and rate of attenuation change to identify and/or characterise a change in flow regime. Likewise the actual propagation rate of the acoustic stimulus may be correlated with the determined flow rate of fluid. This flow rate profile may be used to give a flow rate adjusted profile of acoustic pulse propagation, thus revealing any changes due to a change in composition of the fluid say. An acoustic stimulus suitable for determining Doppler shift may be introduced, e.g. an acoustic pulse with a defined frequency or frequency chirp and the detected acoustic signals from the DAS sensor analysed to detect reflections to perform Doppler analysis and the propagation of the stimulus itself and/or the attenuation of the stimulus may be analysed. Frequency analysis may also be performed. As the DAS sensor may operate continuously the acoustic response may also be continually monitored to detect any of the overall intensity at various sections of the conduit, any changes in intensity, and characteristic frequencies patterns. Any acoustic features in the flow may also be tracked, whether acoustic features of opportunity or features that are deliberately introduced.

The description above describes several methods by which flow rate and/or flow regime may be monitored using a DAS sensor, possibly in combination with other sensors such as DTS sensors. Any or all of the techniques described above may be used together in combination or as a stand alone technique.

The invention has principally been described in relation to downwell applications and DAS sensing is particularly advantageous in such applications. However the techniques are applicable to monitoring flow in any type of conduit and may be useful in applications where difficult of access or harsh operating conditions preclude other types of flow monitoring, for instance subsea pipelines or the like.

The invention claimed is:

1. A method of monitoring fluid flow along a conduit comprising:
   introducing an acoustic stimulus into the fluid within the conduit wherein the acoustic stimulus comprises at least one acoustic pulse having a time varying frequency and/or at least one pulse having a broadband frequency spectrum;
   interrogating an optical fibre deployed along the path of the conduit to provide a distributed acoustic sensor having a plurality of sensing portions of fibre; and
   analysing acoustic signals detected by said plurality of sensing portions of fibre in response to said acoustic stimulus to determine at least one flow characteristic,
   wherein analysing the acoustic signals comprises identifying reflections of said acoustic stimulus caused by the fluid within the conduit and analysing said reflections to determine any Doppler shift in frequency of said reflections of said acoustic stimulus compared to the acoustic stimulus.

2. A method as claimed in claim 1 wherein said at least one flow characteristic comprises a flow regime.

3. A method as claimed in claim 1 wherein said at least one flow characteristic comprises a flow rate.

4. A method as claimed in claim 3 comprising determining the speed of flow of the fluid from said Doppler shift.

5. A method as claimed in claim 1 comprising determining any variation in the speed of flow of the fluid within the conduit from said Doppler shift.

6. A method as claimed in claim 1 wherein the acoustic stimulus comprises at least one acoustic pulse of a defined acoustic frequency.

7. A method as claimed in claim 1 comprising analysing a frequency spread of the detected reflected signal to determine a flow regime.

8. A method as claimed in claim 1 further comprising determining the rate of propagation of the acoustic stimulus along the conduit.

9. A method as claimed in claim 8 comprising analysing the detected acoustic signals to detect any change in propagation speed along the conduit.

10. A method as claimed in claim 1 comprising determining the attenuation of the acoustic stimulus as it travels along the conduit.

11. A method as claimed in claim 10 comprising analysing the detected acoustic signals to detect any change in the rate of attenuation.

12. A method as claimed in claim 10 comprising correlating change in attenuation rate with any change in said Doppler shift along the conduit.

13. A method as claimed in claim 1 wherein analysing the detected acoustic signals comprises applying spectral analysis.

14. A method as claimed in claim 13 comprising determining a frequency dependence of the attenuation of the acoustic signals.

15. A method as claimed in claim 1 comprising inducing the acoustic stimulus using an acoustic transducer.

16. A method as claimed in claim 1 comprising using a separate flow conduit running along the same path as said conduit to introduce said acoustic stimulus into said conduit and/or further comprising introducing an additional acoustic stimulus into the material forming the conduit.

17. A method as claimed in claim 1 wherein the conduit is a flow pipe within a wellbore, and the method is a method of monitoring flow within a wellbore.

18. A method of monitoring fluid flow along a conduit comprising:
   introducing an acoustic stimulus into the fluid within the conduit;

interrogating an optical fibre deployed along the path of the conduit to provide a distributed acoustic sensor having a plurality of sensing portions of fibre; and analysing acoustic signals detected by said plurality of sensing portions of fibre in response to said acoustic stimulus to determine at least one flow characteristic, wherein analysing the acoustic signals comprises identifying reflections of said acoustic stimulus caused by the fluid within the conduit and analysing said reflections to determine any Doppler shift in frequency of said reflections of said acoustic stimulus compared to the acoustic stimulus;

the method further comprising transmitting at least one additional acoustic stimulus into the fluid in the conduit to mix with the reflected signal to improve signal to noise ratio.

19. An apparatus for monitoring fluid flow along a conduit comprising:

an interrogator unit for interrogating an optical fibre deployed along the path of the conduit to provide a distributed acoustic sensor having a plurality of sensing portions of fibre; and a processor configured to analyse acoustic signals detected by said plurality of sensing portions of fibre with an introduced acoustic stimulus propagating in the fluid within the conduit to determine at least one flow characteristic, wherein said processor is configured to analyse the acoustic signals to identify reflections of said acoustic stimulus caused by the fluid within the conduit and analyse said reflections to determine any Doppler shift in frequency of said reflections of said acoustic stimulus compared to the acoustic stimulus;

and wherein said processor is also configured to analyse the detected acoustic signals to determine the rate of propagation of the acoustic stimulus along the conduit and to detect any change in propagation speed along the conduit.

20. An apparatus as claimed in claim 19 wherein said processor is configured to determine the speed of flow of the fluid from said Doppler shift.

21. An apparatus as claimed in claim 19 wherein said processor is configured to determine any variation in the speed of flow of the fluid within the conduit from said Doppler shift.

22. An apparatus as claimed in claim 19 wherein said processor is further configured to determine the attenuation of the acoustic stimulus as it travels along the conduit.

23. An apparatus as claimed in claim 19 further comprising at least one acoustic transducer for generating a propagating acoustic stimulus in said conduit.

* * * * *